No. 879,472. PATENTED FEB. 18, 1908.
P. KELLER.
GAS PRESSURE REGULATOR.
APPLICATION FILED MAY 18, 1907.
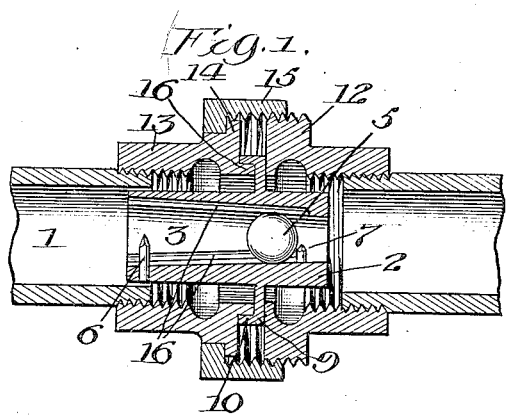
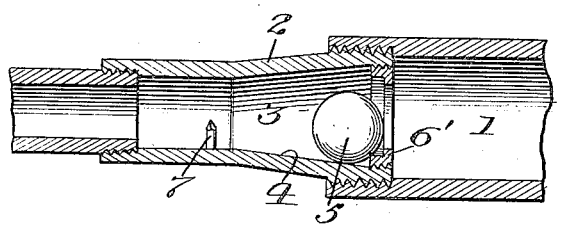
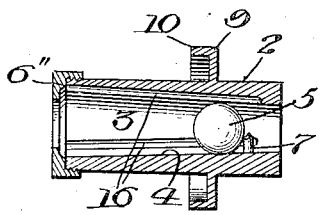  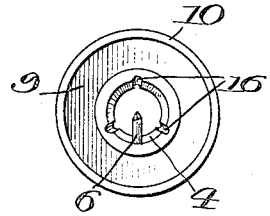
Witnesses
C. M. Mennies
A. S. Phillips
Inventor
Peter Keller
by Clarence K. Chamberlain
Atty

UNITED STATES PATENT OFFICE.

PETER KELLER, OF CHICAGO, ILLINOIS.

GAS-PRESSURE REGULATOR.

No. 879,472.

Specification of Letters Patent.

Patented Feb. 18, 1908.

Application filed May 18, 1907. Serial No. 374,460.

*To all whom it may concern:*

Be it known that I, PETER KELLER, a citizen of the United States, residing at the city of Chicago, in the county of Cook and State of Illinois, have invented a new and useful Improvement in Gas-Pressure Regulators, of which the following is a specification.

My invention relates to devices for controlling the flow of fluids and particularly of illuminating gases through pipes.

The object thereof is to provide a simple, cheap and convenient apparatus by which the pressure of illuminating gas may be automatically regulated and controlled and by which the volume of such gas may be taken from the service pipes at varying pressures and delivered to the house pipes or to a particular point of combustion as, for instance, a gas stove at constant pressure.

My device further is of such a character that the standard unions used for detachably connecting piping may be used as a casing to inclose the device and to become an actual part thereof.

The principles of my invention are illustrated in the drawings, in which—

Figure 1 shows one form of my device as used in connection with a standard union; Fig. 2 shows another form thereof which may be connected directly to the piping; Fig. 3 is an alternative form, and Fig. 4 is an end view of the device when removed from Fig. 1, and looking toward the right.

Further describing my invention with reference to the drawings: 1 is a service pipe from which gas passes into my device.

2 is a shell or tube having a conical chamber 3 whose longitudinal axis is approximately horizontal, thereby causing the lower side 4 of the chamber 3 to be somewhat slanted from the perpendicular axis. Within the said chamber is contained a closure ball 5 which, under the influence of gravity, will normally seek the lowest position at the larger end of the chamber. Its movement may be stopped and it may be kept from leaving the chamber by a pin 6, as shown in Fig. 1 by a screw plug 6' as shown in Fig. 2, by a screw cap 6'' as shown in Fig. 3, or by any other means. Progression of the ball in the other direction, viz., with the flow of the gas, may be stopped by pins 7 or any other suitable means, which will prevent wedging the ball within the tapering wall of chamber 3.

The features thus far described are practically common to the different embodiments of my invention shown in the drawings.

In Figs. 1 and 3 the shell 2 is provided with an annular flange 9 having an annular off-set portion 10. When so provided an ordinary union may be used as a setting and housing therefor without any special work either on the union or the device itself. Such union ordinarily consists of an externally threaded member 12 and a shouldered member 13. The shoulder of the last named element is adapted to be engaged by the screw ring or binding nut 15, the threads on which engage the external threads of part 12. The shouldered member 13 is usually provided with the ring or annular flange 16. And when it is desired to place my device in position therein, the off-set portion 10 of the annular flange 9 will encircle the said flange 16 and center the device in the union and the service pipe to which it may be attached. The other portion 12 of the union when placed in proper relative position and the nut 15 is turned in place, will be drawn against the lower side of said annular flange 9 and hold the entire device properly centered in the piping. The device is thus securely inclosed against accidental or other injury, and when connected up and the device given its proper horizontal position will work indefinitely and automatically to control the flow of gas therethrough. As the pressure of gas in the mains becomes greater, the increased current will carry the ball with it, rolling it up the incline, and thus decreasing the size of the passage. In extreme cases the ball may be blocked by the stop, otherwise it will constantly fluctuate with increasing and decreasing pressure to keep a constant flow through the apparatus and constant pressure in the spaces beyond. To prevent complete closing of the device grooves 16 may be provided as shown in Figs. 1 and 3, through which a certain amount of current flow will pass in any event. The closure 5 will then serve to regulate the pressures over and above the flow therethrough, which is continuous and constant whenever gas is being used.

I claim and desire to secure by Letters Patent—

1. In combination with a pipe union having a shouldered member and an annular flange thereon; a gas pressure regulator having a casing provided with an annular flanged and an off-set portion adapted to encircle the flange on the union and a closure therein, said union being adapted to act as a housing for said regulator.

2. In combination with a pipe union comprising a plurality of members and a binding nut; one of said members being shouldered and provided with an annular flange, a gas pressure regulator adapted to be placed within said union and provided with an annular flange and an off-set portion adapted to encircle the flange on said shouldered member of the union.

3. In combination with a pipe union having a member provided with an annular flange; a pressure regulator adapted to be placed within said union and having an annular flange and an off-set portion adapted to encircle the annular flange in said member.

4. In a gas controlling device, a casing provided with a conical gas pressure chamber so placed that its longitudinal axis is substantially horizontal, a ball closure in said passage, and means for limiting the traverse of said closure in both directions.

5. In a gas controlling device, a casing provided with a conical gas pressure chamber having its longitudinal axis in substantially horizontal position, a longitudinal groove throughout the length of the inner wall of said chamber, a ball closure in said chamber, and means for limiting the traverse of said closure.

6. In combination with a pipe union, a gas pressure regulator comprising a casing provided with a conical gas passage so placed that its longitudinal axis is substantially horizontal, a ball closure in said passage, and means for limiting the traverse of said closure, said union being adapted to inclose and act as a housing for said regulator.

In testimony whereof I have hereunto set my hand this 2nd day of May A. D. 1907, in the presence of two subscribing witnesses.

PETER KELLER.

Witnesses:
C. K. CHAMBERLAIN,
A. S. PHILLIPS.